United States Patent
Kauchak et al.

(10) Patent No.: US 8,311,997 B1
(45) Date of Patent: *Nov. 13, 2012

(54) GENERATING TARGETED PAID SEARCH CAMPAIGNS

(75) Inventors: David Robert Kauchak, San Mateo, CA (US); Monifa Akanke Porter, Oakland, CA (US); Shreehari Manikarnika, Sunnyvale, CA (US)

(73) Assignee: Adchemy, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,776

(22) Filed: Jan. 3, 2012

Related U.S. Application Data

(63) Continuation of application No. 12/493,997, filed on Jun. 29, 2009, now Pat. No. 8,103,650.

(51) Int. Cl.
  *G06F 7/00* (2006.01)
  *G06F 17/30* (2006.01)
(52) U.S. Cl. .................................................. 707/705
(58) Field of Classification Search .................. None
  See application file for complete search history.

(56) References Cited

U.S. PATENT DOCUMENTS

| | | | |
|---|---|---|---|
| 6,697,998 B1 | 2/2004 | Damerau | |
| 7,162,468 B2 * | 1/2007 | Schwartz et al. | 1/1 |
| 7,548,929 B2 * | 6/2009 | Collins et al. | 1/1 |
| 8,090,724 B1 * | 1/2012 | Welch et al. | 707/750 |
| 8,135,728 B2 * | 3/2012 | Yih et al. | 707/765 |
| 2001/0020238 A1 * | 9/2001 | Tsuda | 707/5 |
| 2002/0194158 A1 * | 12/2002 | Stensmo | 707/2 |
| 2003/0004942 A1 | 1/2003 | Bird | |
| 2003/0140033 A1 * | 7/2003 | Iizuka et al. | 707/1 |
| 2004/0225667 A1 * | 11/2004 | Hu et al. | 707/100 |
| 2004/0243409 A1 | 12/2004 | Nakagawa | |
| 2005/0021508 A1 * | 1/2005 | Matsubayashi et al. | 707/3 |
| 2005/0022106 A1 * | 1/2005 | Kawai et al. | 715/500 |
| 2005/0108200 A1 * | 5/2005 | Meik et al. | 707/3 |
| 2005/0149396 A1 * | 7/2005 | Horowitz et al. | 705/14 |
| 2006/0004628 A1 * | 1/2006 | Axe et al. | 705/14 |
| 2006/0026152 A1 * | 2/2006 | Zeng et al. | 707/5 |
| 2007/0027865 A1 * | 2/2007 | Bartz et al. | 707/5 |

(Continued)

OTHER PUBLICATIONS

Nigam et al., "Using Maximum Entropy for Text Classification," *In IJCAI-99 Workshop on Machine Learning for Information Filtering*, School of Computer Science, Just Research, 1999.

(Continued)

*Primary Examiner* — Robert Timblin
*Assistant Examiner* — Jessica N Le
(74) *Attorney, Agent, or Firm* — Baker Botts L.L.P.

(57) ABSTRACT

In particular embodiments, annotating each keyword of a plurality of keywords with one or more labels of a plurality of labels, comprising: for each label, computing a score for the keyword document corresponding to the keyword and the label using an annotation model; and annotating the keyword with a specific label where the keyword document corresponding to the keyword and the specific label have the highest or the lowest score. Constructing a classifier based on a plurality of training keywords. For each keyword of the plurality of keywords, for each label annotating the keyword, calculating a second index-wise product between a word count vector of the keyword document corresponding to the keyword and a word count vector of the label document corresponding to the label; and predicting whether the label annotating the keyword is correct using the classifier with the second index-wise product as an input to the classifier.

30 Claims, 2 Drawing Sheets

U.S. PATENT DOCUMENTS

| | | | |
|---|---|---|---|
| 2008/0040221 A1* | 2/2008 | Wiseman et al. | 705/14 |
| 2008/0189253 A1* | 8/2008 | Oliver et al. | 707/3 |
| 2010/0036726 A1* | 2/2010 | Gallet | 705/14.43 |
| 2010/0185689 A1 | 7/2010 | Hu | |
| 2010/0280985 A1 | 11/2010 | Duchon | |
| 2010/0293062 A1* | 11/2010 | Lukose et al. | 705/14.73 |

OTHER PUBLICATIONS

Collins et al., "New Ranking Algorithms for Parsing and Tagging: Kernels over Discrete Structures, and the Voted Perceptron," *Proceedings of the 40th Annual Meeting of the Association for Computational Linguistics (ACL)*, Philadelphia, pp. 263-270, Jul. 2002.

Mitchell, Tom M., *Machine Learning*, McGraw-Hill International Editions Computer Science Series, Chap. 4: Artificial Neural Networks, pp. 81-121, Chapter 6: Bayesian Learning: 6.9 Naive Bayes Classifier, pp. 177-184, 1997.

Cristianini, Nello et al., *An Introduction to Support Vector Machines and other kernel-based learning methods*, Cambridge University Press, Chap. 6: Support Vector Machines, pp. 93-112.

* cited by examiner

GENERATING TARGETED PAID SEARCH CAMPAIGNS

CROSS REFERENCE TO RELATED APPLICATION(S)

This application is a continuation of co-pending U.S. patent application Ser. No. 12/493,997, filed on 29 Jun. 2009, entitled "Generating Targeted Paid Search Campaigns", by David Robert Kauchak et al.

TECHNICAL FIELD

The present disclosure generally relates to online advertising.

BACKGROUND

The Internet provides a versatile medium for advertising. An advantage of Internet advertising over more traditional advertising (such as advertising on billboards or in newspapers or magazines) is more customized or personal advertising, even down to the level of individual users, owing to the dynamic nature of the Internet and the ability to collect information about individual users. More personalized advertising tends to be more effective than less personalized advertising, and personalized advertising tends to be more effective when the advertisements are specifically directed at users who are more likely to be interested in the advertisements. Such users are less likely to discard or ignore the advertisements, and as a result the advertisements are more likely to generate revenue. At the same time, more personalized advertising typically reduces advertising costs for advertisers, as the advertisements are usually delivered to fewer users.

DESCRIPTION OF EXAMPLE EMBODIMENTS

Figure 1:
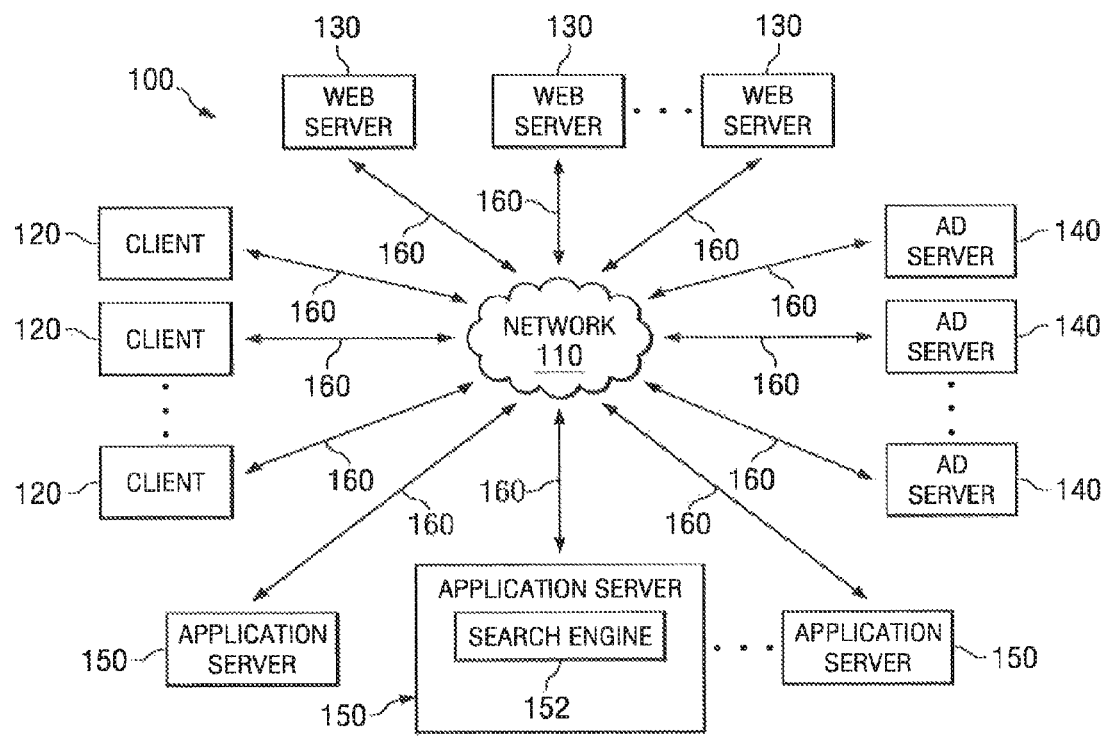
FIG. 1 illustrates an example system for generating targeted paid search campaigns.

The Internet contains a vast amount of information. A user may locate specific information on the Internet with the help of a search engine, such as, for example, GOOGLE SEARCH or YAHOO! SEARCH. Typically, a user provides the search engine one or more words describing the specific information that the user is looking for. The words form a search query. In response to a search query, the search engine may conduct a search over the Internet by executing one or more search algorithms using the search query provided by the user to generate a search result. The search result may identify one or more web pages that are likely to contain information described by the search query. The search result may be presented to the user as a list of web pages including a title, a Uniform Resource Locator (URL), and a brief summary (or snippet) for each of the web pages. The search engine (or other application) may dynamically construct a separate web page for presenting the list of web pages in the search result to the user. The user may then select the URL for a web page in the list to navigate to the web page.

Search-engine providers (such as GOOGLE and YAHOO) may present to users advertisements that are part of targeted marketing campaigns by, for example, presenting the advertisements to the users along with search results requested by the users. To facilitate the presentation of more personalized advertisements to the users, particular embodiments utilize advertising groups (or ad groups) that each includes one or more advertisements (or ad copies) and one or more keywords, each keyword being a short segment of text of one or more words (e.g., typically, one to five words). The ad copies in an ad group are presented to the users based on similarities between the keywords in the ad group and search queries provided to search engines by the users. Different ad copies may be presented to different users at different times. The ad copies and keywords in an ad group may all relate to a particular category of advertising or advertising information. As an example and not by way of limitation, a first ad group may include ad copies and keywords directed to a particular sub-category of sports equipment; a second ad group may include ad copies and keywords directed to vacation packages in a particular area; a third ad group may include ad copies and keywords directed to specific career opportunities; and so on. In particular embodiments, one or more advertisers may provide one or more such ad groups.

During a targeted marketing campaign, when a user provides a search query to a search engine, particular embodiments compare the search query with keywords associated with one or more ad groups. If the search query matches or is otherwise similar to one or more of the keywords associated with an ad group, particular embodiments may present to the user one or more of the ad copies in the ad group. As an example and not by way of limitation, a dynamically constructed web page for presenting the search result to the user may include one or more of the ad copies.

Particular embodiments may generate an ad group and its ad copies from a set of keywords. In particular embodiments, a keyword may describe various characteristics or features of particular subject matter. A keyword may, through one or more processes described or illustrated herein, become associated with an ad group. A keyword may include one or more words. Particular embodiments may build a set of keywords from search queries received at one or more search engines from one or more users over a period of time. The resulting set of keywords effectively may be a collection of search queries. In addition or as an alternative, in particular embodiments, one or more advertisers, publishers, ad campaign sponsors, or other suitable entities may provide a set of keywords, which may be a result of one or more manual processes. Although the present disclosure describes or illustrates particular methods or sources for obtaining sets of keywords, the present disclosure contemplates any suitable methods or sources for obtaining sets of keywords.

Particular embodiments annotate each keyword with one or more labels that provide information about the keyword. As an example and not by way of limitation, a label annotating a keyword may describe the keyword, one or more aspects of the keyword, or one or more categories or concepts represented by the keyword. Particular embodiments may group together keywords annotated with matching or otherwise similar labels to form an ad group. Other particular embodiments may group together keywords annotated with matching or otherwise similar labels and then divide the resulting group on the basis of the similarity or lack thereof between the keywords in the broader group, each resulting division forming a separate ad group. Moreover, for each ad group, particular embodiments may generate one or more ad copies from one or more predetermined ad-copy templates.

FIG. 1 illustrates an example system 100 for generating ad groups and ad copies for each of the ad groups based on a set of keywords. System 100 includes a network 110 coupling one or more clients 120, one or more web servers 130, one or more advertising servers (ad servers) 140, and one or more application servers 150 to each other. Each server may be a unitary server or may be a distributed server spanning multiple computers or multiple datacenters. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 110 or a combination of two or more such networks 110. The present disclosure contemplates any suitable network 110.

One or more links 160 couple a client 120, a web server 130, an ad server 140, or an application server 150 to network 110. In particular embodiments, one or more links 160 each includes one or more wireline, wireless, or optical links 160. In particular embodiments, one or more links 160 each includes an intranet, an extranet, a VPN, a LAN, a WLAN, a WAN, a MAN, a portion of the Internet, or another link 160 or a combination of two or more such links 160. The present disclosure contemplates any suitable links 160 coupling clients 120, web servers 130, ad server 140, and application servers 150 to network 110.

In particular embodiments, a client 120 enables a user at client 120 to access web pages hosted by web servers 130. As an example and not by way of limitation, a client 120 may be a desktop computer system, a notebook computer system, a netbook computer system, or a mobile telephone having a web browser, such as MICROSOFT INTERNET EXPLORER, GOOGLE CHROME or MOZILLA FIREFOX, which, for example, may have one or more add-ons, plug-ins, or other extensions, such as GOOGLE TOOLBAR or YAHOO TOOLBAR. The present disclosure contemplates any suitable clients 120. A user at client 120 may enter a Uniform Resource Locator (URL) or other address directing the web browser to a web server 130, and the web browser may generate a Hyper Text Transfer Protocol (HTTP) request and communicate the HTTP request to web server 130. Web server 130 may accept the HTTP request and communicate to client 120 one or more Hyper Text Markup Language (HTML) files responsive to the HTTP request. Client 120 may render a web page based on the HTML files from web server 130 for presentation to the user. The present disclosure contemplates any suitable web page files. As an example and not by way of limitation, web pages may render from HTML files, Extensible HyperText Markup Language (XHTML) files, or Extensible Markup Language (XML) files, according to particular needs. Such pages may also execute scripts such as, for example and not by way of limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate. The present disclosure contemplates any suitable web pages. As an example and not by way of limitation, web pages hosted by web servers 130 may be static or dynamic.

In particular embodiments, multiple web pages stored together in a common directory at a web server 130 make up a website or a portion of a website. Herein, reference to a publisher may encompass one or more websites published by the publisher, and vice versa, where appropriate. In particular embodiments, a web page includes one or more elements. As an example and not by way of limitation, presented (or rendered) elements of a web page may include static text, static images, animated images, audio, video, interactive text, interactive illustrations, buttons, hyperlinks, or forms. Such elements may each occupy a particular space on the web page when displayed. Internal (or hidden) elements of a web page may include, for example and not by way of limitation, comments, meta elements, databases, diagramation and style information, and scripts, such as JAVASCRIPT. One or more elements of a web page may be inline frames (IFrames) which enable web developers to embed HTML documents into other HTML documents. Herein, reference to a document may encompass a web page, where appropriate. Reference to an element of a web page may encompass one or more portions of a web page file for rendering the element, and vice versa, where appropriate.

One or more elements of a web page may be advertisements. A position in the web page where an advertisement is placed may be called an ad-space. In particular embodiments, an advertisement has various attributes. As an example and not by way of limitation, attributes of an advertisement may include format (such as text, image, video, audio, animation, gadget, etc.); size; web page position (such as top, left, above the fold, below the fold, etc.); inclusion method (such as being included in the HTML file for the web page, being in an IFrame in the HTML file, or being rendered by execution of a script); presentation mode (such as inline, pop-up, pop-under, pre-roll, etc.); destination landing page URL; ad server (such as DOUBLECLICK DART for ADVERTISERS or GOOGLE ADWORDS); expected click-through rate (eCTR); ad quality score; the ad group that the advertisement belongs to; one or more ad keywords associated with the ad group that the advertisement belongs to; one or more targeted publishers; and advertiser. Online advertising campaigns (which may encompass multiple advertisements at multiple publishers) may have similar attributes. As described below, particular embodiments collect information about advertisements, such as their attributes, for use by advertisers in the planning and management of their online advertising. Particular embodiments similarly collect information about online advertising campaigns.

In particular embodiments, a web server 130 includes one or more servers or other computer systems for hosting web pages or particular elements of web pages. The present disclosure contemplates any suitable web servers 130. As described above, a web server 130 may host HTML files or other file types, or may dynamically create or constitute files upon a request, and communicate them to clients 120 in response to HTTP or other requests from clients 120. In particular embodiments, a web browser at a client 120 may render a web page from one or more HTML files received from one or more web servers 130. In particular embodiments, a web server 130 may render a web page and then serve the rendered web page to a client 120 for display. When a web page renders, the browser or the server rendering the web page may retrieve one or more elements of the web page from one or more web servers 130 or ad servers 140. As an example, multiple web servers 130 operated by a single publisher may host elements of web pages of the publisher. For example, the publisher may operate one or more first web servers 130 for video, one or more second web servers 130 for text, one or more third web servers 130 for images, and one or more fourth web servers 130 for advertisements. Web servers 130 operated by the publisher may serve the domain of the publisher.

In particular embodiments, an ad server 140 includes one or more servers or other computer systems for hosting advertisements for inclusion in web pages hosted by web servers 130. The present disclosure contemplates any suitable ad servers 140. Ad serving platforms for publishers operating ad servers 140, include, for example and without limitation, DOUBLECLICK DART for PUBLISHERS, or GOOGLE ADSENSE. A web page may include elements hosted by any combination of web servers 130 and ad servers 140. When a web browser at a client 120 renders a web page, the web browser may retrieve and load one or more elements of the web page from one or more web servers 130, as directed by one or more HTML or other files for rendering the web page. The web browser may retrieve and load one or more advertisements in the web page from one or more ad servers 140, similarly as directed by the HTML or other files for rendering the web page.

In particular embodiments, application servers 150 each include one or more computer servers or other computer systems, either centrally located or distributed among multiple locations. One or more particular application servers 150 may implement functionality for automatically generating ad groups and ad copies for each of the ad groups based on a set of keywords. One or more particular application servers 150 may each implement a search engine, e.g., search engine 152, that receives search queries from online users and generates search results for presentation to the users in response to the search queries. In particular embodiments, application servers 150 includes hardware, software, or embedded logic components or a combination of two or more such components for providing their respective functionalities. Functionalities provided by application servers 150 may be combined or separated differently and implemented by a single or multiple application servers 150 in different embodiments. In particular embodiments, one or more web servers 130 may each implement a search engine 152.

In particular embodiments, search engine 152 includes hardware, software, or embedded logic component or a combination of two or more such components for generating and returning search results identifying web pages responsive to search queries from clients 130. The present disclosure contemplates any suitable web search engine 152. As an example and not by way of limitation, search engine 152 may include BAIDU, GOOGLE, LIVE SEARCH, or YAHOO! SEARCH.

Figure 2:
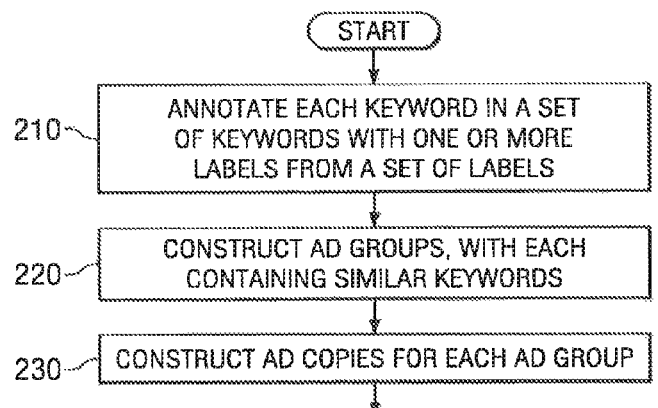
FIG. 2 illustrates an example method for generating targeted paid search campaigns.

FIG. 2 illustrates an example method for generating ad groups and ad copies for each of the ad groups based on a set of keywords. For clarification purposes, hereinafter, let K={Keyword$_1$, . . . , Keyword$_{n_K}$} denote a set of $n_K$ keywords. In particular embodiments, each of the keywords, Keyword$_i \in$K, may contain one or more words. The set of keywords may be obtained from various sources. As an example and not by way of limitation, one or more users may specify one or more keywords, one or more keywords may be collected from search queries received at one or more search engines 152, one or more keywords may be generated by third party applications, and one or more keywords may be derived from marketing campaigns or advertisements.

Particular embodiments annotate each of the keywords in K with one or more labels from a set of labels, for example, as described and illustrated with respect to Step 210 of FIG. 2. For clarification purposes, hereinafter, let L={Label$_1$, . . . , Label$_{n_L}$} denote a set of $n_L$ labels. In particular embodiments, each of the labels, Label$_j \in$L, contains one or more words. Then, each of the keywords in K may be annotated with one or more of the labels in L. In particular embodiments, a label may describe one of the various aspects of the keyword that the label annotates. As an example and not by way of limitation, one or more users, advertisers, publishers, ad campaign sponsors, or other suitable entities may determine the labels used to annotate the keywords. In particular embodiments, the set of labels, L, may be predetermined.

Particular embodiments may use different ways to select the labels in L with which to annotate the keywords in K. For example, particular embodiments may take an "exact match" approach by which Keyword$_i \in$K may be annotated with Label$_j \in$L if Keyword$_i$ contains Label$_j$. In particular embodiments, a keyword contains a label if the keyword includes all the words in the label.

The stem of a word is the portion of the word that is common to all of its inflected variants. For example, the stem of "running" is "run." In particular embodiments, given a keyword, the corresponding stemmed keyword is constructed by replacing all the words in the keyword with their respective stems. Likewise, given a label, the corresponding stemmed label is constructed by replacing all the words in the label with their respective stems. In particular embodiments, Keyword$_i$ is annotated with Label$_j$ if the stemmed keyword corresponding to Keyword$_i$ contains the stemmed label corresponding to Label$_j$.

In particular embodiments, each word in a label is considered the same as some or all of its synonyms when determining whether a keyword contains the label. In particular embodiments, for each word found in any of the labels, define a set of eligible synonyms. A label synonym may then be created for a label by replacing none, some, or all of the words in the label with an eligible synonym. Thus, a label may have multiple synonyms. In particular embodiments, Keyword$_i$ is annotated with Label$_j$ if the keyword contains any one of the synonyms of Label$_j$. Any or all of these matching methods may be used in annotating keywords.

In addition or as an alternative to a matching approach, particular embodiments may take a "similarity based" approach to select the labels in L with which to annotate the keywords in K. In many cases, a keyword contains less than five words. To obtain more information (especially descriptive information) about each of the keywords, for the similarity-based approach, particular embodiments construct a different keyword document for each of the keywords in K and then annotate each of the keywords based on its corresponding keyword document. For clarification purposes, hereinafter, let KD={KeywordDoc$_1$, . . . , KeywordDoc$_{n_K}$} denote a set of $n_K$ keyword documents constructed for the $n_K$ keywords in K, with KeywordDoc$_i \in$KD being constructed for and corresponding to Keyword$_i \in$K.

To construct a keyword document, KeywordDoc$_i \in$KD, for a particular keyword, Keyword$_i \in$K, particular embodiments provide Keyword$_i$ to a search engine 152. Search engine 152 may conduct a search using Keyword$_i$ as the search query and generate a search result that identifies one or more web pages. Particular embodiments may construct KeywordDoc$_i$ for Keyword$_i$ based on the search result.

As explained above, when search engine 152 generates a search result in response to a search query, the search result may identify one or more web pages. In addition to the web pages themselves, the search engine may generate a brief summary for each of the web pages identified in the search result. This brief summary may also be called a text snippet (or text snippets) for the web page. Search engine 152 may rank the web pages based on their respective levels of relevance to the search query. Web pages that are relatively more relevant to the search query are ranked relatively higher than web pages that are relatively less relevant to the search query. Particular embodiments combine the summaries for a predetermined number (such as, for example, 50) of top-ranked web pages in the search result generated in response to Keyword$_i$ into a document, which becomes KeywordDoc$_i$ for Keyword$_i$. In particular embodiments, each of the keywords in K has a corresponding keyword document in KD and the keyword document contains all the words in the summaries of a predetermined number of top-ranked web pages in the search result generated in response to the search query corresponding to the keyword. In particular embodiments, one or more users may specify the number of summaries for combining with each other.

In addition or as an alternative to using the summaries of the web pages, particular embodiments may use the titles of, the anchor text of, or the words in the web pages identified in the search result generated in response to the search query corresponding to each of the keywords to construct the corresponding keyword document for the keyword.

For a similarity-based approach, in particular embodiments, each of the keywords in K may be annotated based on the similarities between its corresponding keyword document and each of the labels in L. For clarification purposes, hereinafter, let sim(KeywordDoc$_i$, Label$_j$) denote the similarity between KeywordDoc$_i \in$KD and Label$_j \in$L. Then, Keyword$_i \in$K corresponding to KeywordDoc$_i$ may be annotated with the label in L that is most similar to KeywordDoc$_i$, as determined, for example, by $$\max_{1 \leq j \leq n_L} (sim(KeywordDoc_i, Label_j)).$$

In particular embodiments, Keyword$_i \in$K corresponding to KeywordDoc$_i$ may be annotated with one or more of the labels in L where the similarities between KeywordDoc$_i$ and the labels satisfy a threshold requirement.

In particular embodiments, sim(KeywordDoc$_i$, Label$_j$) is a cosine similarity between KeywordDoc$_i$ and Label$_j$, with sim (KeywordDoc$_i$, Label$_j$) being a length-normalized, cosine distance between a word-frequency count vector of KeywordDoc$_i$ and a label document constructed for Label$_j$, hereinafter denoted as LabelDoc$_j$. Thus, in particular embodiments, sim(KeywordDoc$_i$, Label$_j$)=sim(KeywordDoc$_i$, LabelDoc$_j$).

A separate label document may be constructed for each of the labels in L similarly to how particular embodiments construct the keyword documents for the keywords. Each of the labels, e.g., Label$_j$, may be used as a search query, and the brief summaries, titles, or anchor texts of or the words in a predetermined number of top-ranked web pages identified in the search result generated in response to Label$_j$ as the search query may be combined with each other to produce the label document, e.g., LabelDoc$_j$, corresponding to Label$_j$. Thus, there is a set of label documents corresponding to L. For clarification purposes, hereinafter, let LD={LabelDoc$_1$, ..., LabelDoc$_{n_L}$} denote a set of n$_L$ label documents constructed for the n$_L$ labels in L, with LabelDoc$_j \in$LD being constructed for and corresponding to Label$_j \in$L.

Particular embodiments may define the similarity between KeywordDoc$_i$ and LabelDoc$_j$ as:

$$sim(KeywordDoc_i, LabelDoc_j) = \frac{\sum_{k=1}^{k=n_W} wc_{i,k} wc_{j,k}}{|wc_i||wc_j|},$$

where: (1) n$_W$ denotes the total number of unique words in the vocabulary of KeywordDoc$_i$ and LabelDoc$_j$; (2) wc$_{i,k}$ denotes the number of times word$_k$ in the vocabulary occurs in KeywordDoc$_i$ (the word count of word$_k$ in KeywordDoc$_i$); (3) wc$_{j,k}$ denotes a number of times word$_k$ in the vocabulary occurs in LabelDoc$_j$ (the word count of word$_k$ in LabelDoc$_j$); (4) wc$_i$ denotes the length of the n$_W$-vector consisting of the wc$_{i,k}$; and (5) wc$_j$ denotes the length of the n$_W$-vector consisting of the wc$_{j,k}$.

In particular embodiments, a similarity-based approach includes per-word dimension weighting. The similarity between a keyword document and a label document is modified by multiplying each word's product by its corresponding weight. In particular embodiments, a word's weight is calculated as the inversed document frequency of the word in a particular corpus (commonly referred to as the inverse document frequency), which equals the total number of documents in the corpus divided by the log of the number of documents in which the word occurs. In particular embodiments, the corpus used is the set of keywords, e.g., K. In particular embodiments, the corpus is the set of labels, e.g., L. In particular embodiments, the corpus used is an external corpus, such as, for example, a set of web pages or a set of news articles.

In addition or as an alternative to a matching or similarity-based approach, particular embodiments may take a "classification based" approach to select one or more labels with which to annotate a keyword. For a classification-based approach, given a set of keyword documents, e.g., KD, an annotation model, hereinafter denoted as AM, that represents a mapping from the keyword documents in KD to the labels in L, may be constructed based on a set of training keyword documents and a corresponding set of training keywords. A training keyword is similar to a keyword, and a training keyword document is similar to a keyword document and may be constructed for a training keyword in the same way as a keyword document being constructed for a keyword. Particular embodiments may have one or more humans annotate each of the training keyword documents with one or more labels selected from L. Consequently, a set of labels that includes one or more labels selected from L may be obtained for each of the training keyword documents. For clarification purposes, hereinafter, let L$_i$={Label$_1$, ...} denote the set of labels annotating a particular keyword document or a particular training keyword document, e.g., KeywordDoc$_i$. Particular embodiments may construct AM from all the sets of labels annotating all the training keyword documents. The annotation model, AM, may produce a score for each pair of keyword and label or for each pair of keyword document and label, hereinafter denoted as Score(Keyword$_i$, Label$_j$) or Score(KeywordDoc$_i$, Label$_j$). Each score indicates the appropriateness of a particular label for a particular keyword or a particular keyword document.

Thereafter, given a corresponding pair of keyword and keyword document not previously annotated, e.g., Keyword$_i \in$K and KeywordDoc$_i \in$KD, Keyword$_i$ may be annotated with $$\max_{1 \leq j \leq n_L} (AM(KeywordDoc_i, Label_j)).$$

In particular embodiments, for each of the keyword documents in KD, the label annotating the keyword document may be obtained using an automatic annotating approach, such as, for example, the similarity-based or the classification-based approach as described above. Once the keyword documents have been automatically annotated, a human decision may be obtained concerning the correctness of each annotating of a particular keyword document. Hereinafter, let correct(KeywordDoc$_i$, L$_i$) denote a human decision on the correctness of the automatic annotating for KeywordDoc$_i$. The set of the labeled keyword documents and the set of the human decisions about the correctness of the labels may form a new data set consisting of the index-wise product between the word count vector of each of the keyword documents and the word count vector of the label document for the corresponding label. Hereinafter, let $P_i$ denote the index-wise product between the word count vectors of KeywordDoc$_i$ and $L_i$. Each of the index-wise products may then be paired with the corresponding human correctness decision, as [$P_i$, correct(KeywordDoc$_i$, $L_i$)].

A binary classifier may be trained using a set of such pairs for $n_K$ keyword documents, $\{[P_1, \text{correct}(\text{KeywordDoc}_1, L_1)], \ldots [P_{n_K}, \text{correct}(\text{KeywordDoc}_{n_K}, L_{n_K})]\}$, to predict whether a proposed label for a keyword document, e.g., KeywordDoc$_i$, is correct. The binary classifier takes as input the index-wise product, denoted as $P_i$, between the word count vector for the keyword document and the word count vector for the label document of the proposed label. This classifier may be used after annotation to filter out examples labeled as incorrect by the trained classifier. In particular embodiments, potential classifiers may include, for example, maximum entropy, Support Vector Machines (possibly with multiple kernels), boosted decision trees/stumps, Neural networks, and naïve Bayes classifiers.

In particular embodiments, if the above classifier has a probability or confidence score associated with the prediction, the score may be added to the annotation label. The score may assist in human review or correction of the annotations. For example, a human may review the annotations of the keyword documents in sorted order based on the confidence score or only review those annotations of the keyword documents that do not meet a particular confidence score threshold. This may be referred to as "annotation rescoring."

In particular embodiments, a ranking function may be obtained from an unseen $P_i$, the index-wise product for a new keyword document, KeywordDoc$_i$, based on one or more ranking algorithms described by Michael Collins and Nigel Duffy in *New Ranking Algorithms for Parsing and Tagging: Kernels over Discrete Structures, and the Voted Perceptron*, 40TH ANNUAL MEETING OF THE ASSOCIATION FOR COMPUTATION LINGUISTICS (ACL), July 2002, pp. 263-70. In particular embodiments, the weights from this ranking function may be used as new word-index weightings for the similarity-based approach. This may be referred to as "perceptron rescoring."

Particular embodiments categorize information in advertisements into vertical specifics, with each vertical specific representing a category of advertising information. Within the context of the present disclosure, the term "category" and the term "vertical specific" may be interchangeable. As an example and not by way of limitation, one advertising category (or vertical specific) may encompass advertisements relating to electronic products; another may encompass advertisements relating to university degrees; and so on.

One or more categories may each include subcategories, with each subcategory encompassing a unique characteristic or feature of the category. Another term for subcategory may be dimension, and vice versa. Within the context of the present disclosure, the term "subcategory" and the term "dimension" may be interchangeable. In particular embodiments, the subcategories (or dimensions) of a category may at least in part characterize, define, describe, or explain the category. As an example and not by way of limitation, "education" may be a category (or vertical specific) and may have the following subcategories (or dimensions): "degree"; "area of study"; "program"; "profession"; "graduation date"; "years to earn degree"; "major"; "minor"; "school"; "grades"; "class rank"; "honors"; "internship"; "school clubs"; and "extracurricular activities." In particular embodiments, the labels annotating the keywords may serve as metadata for the keywords along different vertical specifics and along different dimensions. In particular embodiments, one or more users, advertisers, publishers or other suitable entities may specify vertical specifics and their dimensions.

As an example and not by way of limitation, consider the keyword "B.S. electrical engineering degrees online." A keyword document constructed as described above may correspond to the keyword "B.S. electrical engineering degrees online." The vertical specific for the keyword "B.S. electrical engineering degrees online" may be "education," and the vertical specific "education" may have multiple dimensions (such as, for example, "major," "degree," "school," etc.) for describing the keyword "B.S. electrical engineering degrees online." Based on the keyword document corresponding to the keyword "B.S. electrical engineering degrees online," particular embodiments may annotate the keyword "B.S. electrical engineering degrees online" with the following labels: "education" for the vertical specific, "electrical engineering" for the "major" dimension, "bachelor of science" for the "degree" dimension, "online university" for the "school" dimension, and so on. The labels indicate that the keyword "B.S. electrical engineering degrees online" in this case is more generally related to education and more specifically related to obtaining a B.S. degree in electrical engineering from a university with an online program.

Particular embodiments annotate each keyword with a label identifying a vertical specific to which the keyword belongs. Each keyword is then annotated with a label from each of the dimensions within the particular vertical specific to which the keyword belongs. Particular embodiments generate keywords relevant to particular vertical specifics. Therefore, each keyword may be directly annotated with a label identifying the vertical specific to which the keyword belongs without using any of the annotation methods described above.

After obtaining one or more labels for each of the keywords, particular embodiments may construct one or more ad groups based on the labels annotating the keywords, as described and illustrated with respect to Step 220 of FIG. 2.

In particular embodiments, all keywords annotated with the same labels may first be grouped together into the same keyword group. As an example and not by way of limitation, if Keyword$_1$ and Keyword$_2$ are annotated with the same labels, then particular embodiments may group Keyword$_1$ and Keyword$_2$ into the same keyword group. Consequently, one or more keyword groups may be formed, with each keyword group containing one or more keywords annotated with the same labels. In particular embodiments, the keywords grouped together into separate keyword groups may be selected from a set of keywords, e.g., K. For clarification purposes, hereinafter, let KG=$\{\text{KeywordGroup}_1, \ldots, \text{KeywordGroup}_{n_{KG}}\}$ denote a set of $n_{KG}$ keyword groups constructed by grouping the keywords annotated with the same labels together.

In particular embodiments, a separate ad group may be formed for each of the keyword groups in KG, and the ad group contains all the keywords contained in the corresponding keyword group. As an example and not by way of limitation, one ad group may be formed for KeywordGroup$_1$ and contains all the keywords in KeywordGroup$_1$, another ad group may be formed for KeywordGroup$_2$ and contains all the keywords in KeywordGroup$_2$, and so on. In this particular case, there are $n_{KG}$ ad groups corresponding to $n_{KG}$ keyword groups.

In practice, however, a set of keywords, e.g., K, may include hundreds of thousands of keywords or more, and many of the keywords in the set may be annotated with the same labels. As a result, each keyword group may contain a large number of keywords. If an ad group is formed for such a keyword group, then the ad group also contains a large number of keywords. To decrease the number of keywords in each keyword group and consequently in each ad group, particular embodiments further separate the keywords in each of the keyword groups into multiple keyword subgroups using a K-Means clustering algorithm. In statistics and machine learning, K-Means clustering is a method of cluster analysis that aims to partition n observations into k clusters in which each observation belongs to the cluster with the nearest mean.

For example, consider a particular keyword group, KeywordGroup$_i$, that contains $n_{KG_i}$ keywords, $$KeywordGroup_i = \{Keyword_1, \ldots, Keyword_{n_{KG_i}}\},$$

all annotated with the same labels. The set of keyword documents corresponding to the keywords in KeywordGroup$_i$ is $$KD_{KG_i} = \{KeywordDoc_1, \ldots, KeywordDoc_{n_{KG_i}}\}.$$

Let b denote a target keyword subgroup size that may be specified by one or more users. The K-Means clustering algorithm starts with $$\frac{|KD_{KG_i}|}{b} = \frac{n_{KG_i}}{b}$$

initial random clusters. Particular embodiments may use a length-normalized, cosine distance between the word frequency count vectors of the keyword documents in KD$_{KG_i}$ as a similarity measure. In particular embodiments, inverse document frequency weightings, as described above, may be used as a weighting within the similarity measure.

In particular embodiments, each keyword group may be further separated into multiple keyword subgroups using K-Means clustering. For a particular keyword group, KeywordGroup$_i$, each of the keywords in KeywordGroup$_i$ may belong to one of the keyword subgroups derived from KeywordGroup$_i$. In particular embodiments, a separate ad group may be formed for each of the keyword subgroups derived from each of the keyword groups in KG, and the ad group contains all the keywords contained in the corresponding keyword subgroup. In this particular case, if $n_{KSG_i}$ denotes the number of keyword subgroups derived from KeywordGroup$_i$, then there are a total of $$\sum_{i=1}^{i=n_{KG}} n_{KSG_i}$$

ad groups.

After forming the ad groups, particular embodiments generate one or more ad copies for each of the ad groups, for example, as described and illustrated with respect to Step 230 of FIG. 2. In particular embodiments, one or more users (such as, for example, one or more advertisers) may predetermine a set of ad-copy templates. An ad-copy template may include one or more static elements and one or more dynamic elements. To construct an ad copy from an ad-copy template for a particular ad group, particular embodiments may replace one or more dynamic elements in the ad-copy template with one or more labels annotating the keywords in the ad group, which may serve as labels for the ad group itself.

As an example and not by way of limitation, consider an ad-copy template created for an education-related advertisement that includes the sentence, "Want to earn a <DEGREE> in <MAJOR>? Come to <SCHOOL>!" In the sentence, "< >" marks a dynamic element. Replacing the dynamic elements <DEGREE>, <MAJOR>, and <SCHOOL> with the labels "bachelor of science," "electrical engineering," and "Stanford University" respectively results in the following sentence: "Want to earn a bachelor of science in electrical engineering? Come to Stanford University!" An ad-copy for display to one or more users may include the resulting sentence.

In particular embodiments, one or more restrictions may be attached to an ad-copy template, for example, by a user creating the ad-copy template. As an example and not by way of limitation, a restriction on the ad-copy template may identify an ad group, advertising category, advertiser, or other entities to which or whom the ad-copy template applies. In particular embodiments, these restrictions may be based on the ad group labels.

In particular embodiments, to generate an ad copy for an ad group from an ad-copy template, restrictions, if any, that are attached to the ad-copy template may be examined. Ad-copy templates that meet the restriction requirements for the ad group may be used to generate ad copies for the ad group. If the ad-copy template may be used to generate ad copies for the ad group, one or more dynamic elements in the ad-copy template may be replaced with one or more appropriate labels of the ad group. The resulting texts may be corrected based on one or more grammar rules, where appropriate. In particular embodiments, grammar substitution rules (which one or more human experts may provide along with alternative wording possibilities) may be applied to the ad copy to create a more grammatically correct version of the ad copy, e.g., "a" instead of "an" where appropriate. In particular embodiments, all variations of the ad copy resulting from such substitutions or variations may be scored with a probabilistic language model. In general, a statistical language model assigns a probability to a sequence of n words by means of a probability distribution. The ad copy variation with a best score may be selected as a final version for the ad group.

An advertiser or publisher may have a length restriction for an advertisement. In particular embodiments, when generating an ad copy for an ad group from an ad-copy template, such a restriction may be enforced. If an ad copy is too long (possibly in terms of the number of words or the number of letters in the ad copy) human-specified synonyms may be tried to reduce the length of the ad copy by changing one or more words in the ad copy. As an example and not by way of limitation, the phrase "bachelor of science" may be replaced with "B.S." If a variation of the ad copy is found that meets the length restriction, that variation may be accepted as the final version. Moreover, a landing page may be identified with the ad copy by its URL so that when a user selects the ad copy, the user proceeds to a correct landing page. Particular embodiments include or encode one or more of the labels of the ad group for which the ad copy is created in the URL of the landing page.

Particular embodiments may be implemented as hardware, software, or a combination of hardware and software. As an example and not by way of limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 3:
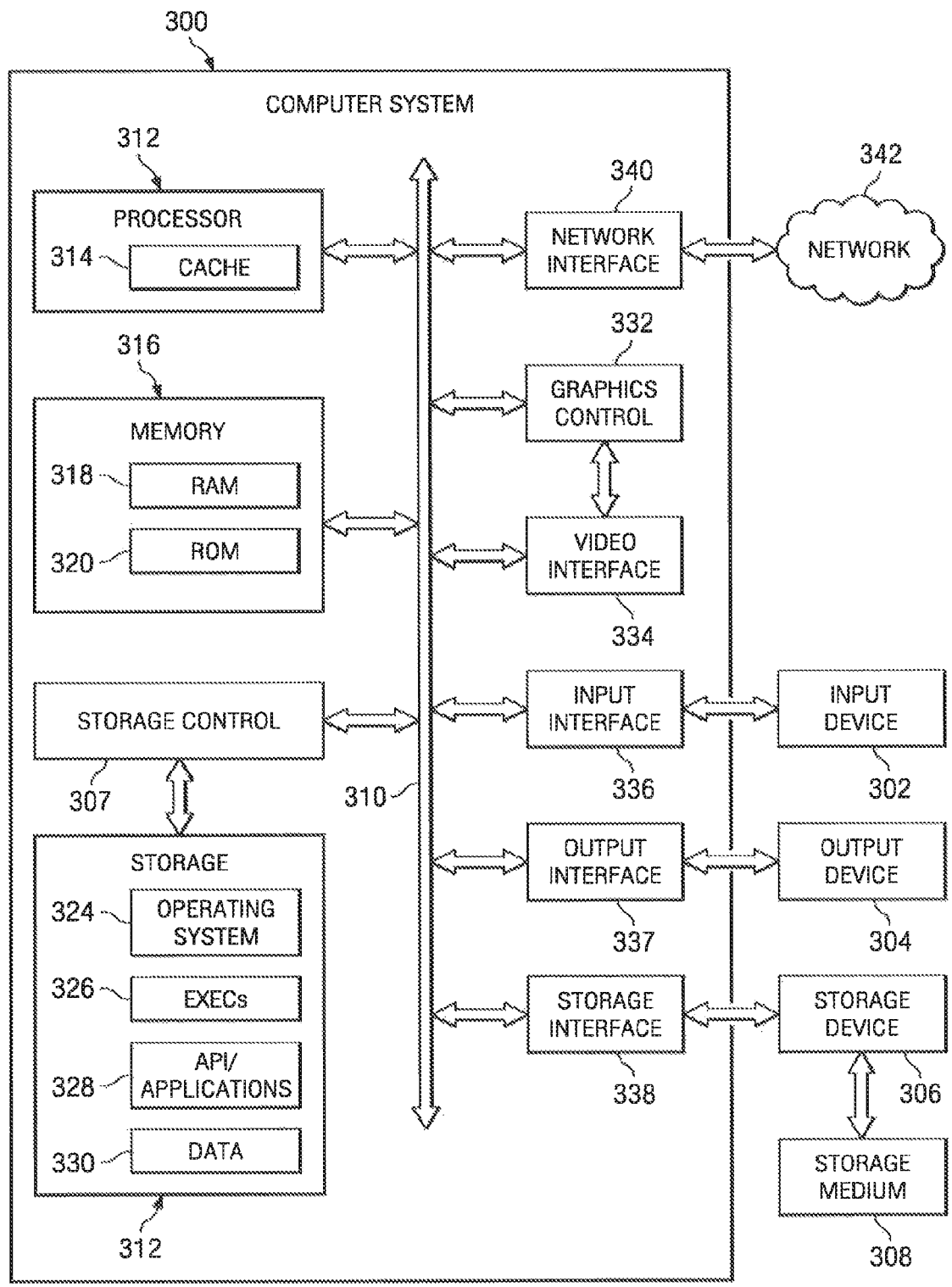
FIG. 3 illustrates an example computer system.

For example, FIG. 3 illustrates an example computer system 300 suitable for implementing one or more portions of particular embodiments. Although the present disclosure describes and illustrates a particular computer system 300 having particular components in a particular configuration, the present disclosure contemplates any suitable computer system having any suitable components in any suitable configuration. Moreover, computer system 300 may have take any suitable physical form, such as for example one or more integrated circuit (ICs), one or more printed circuit boards (PCBs), one or more handheld or other devices (such as mobile telephones or PDAs), one or more personal computers, or one or more super computers.

Computer system 300 may have one or more input devices 302 (which may include a keypad, keyboard, mouse, stylus, etc.), one or more output devices 304 (which may include one or more displays, one or more speakers, one or more printers, etc.), one or more storage devices 306, and one or more storage medium 308. An input device 302 may be external or internal to computer system 300. An output device 304 may be external or internal to computer system 300. A storage device 306 may be external or internal to computer system 300. A storage medium 308 may be external or internal to computer system 300.

System bus 310 couples subsystems of computer system 300 to each other. Herein, reference to a bus encompasses one or more digital signal lines serving a common function. The present disclosure contemplates any suitable system bus 310 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 300 includes one or more processors 312 (or central processing units (CPUs)). A processor 312 may contain a cache 314 for temporary local storage of instructions, data, or computer addresses. Processors 312 are coupled to one or more storage devices, including memory 316. Memory 316 may include random access memory (RAM) 318 and read-only memory (ROM) 320. Data and instructions may transfer bidirectionally between processors 312 and RAM 318. Data and instructions may transfer unidirectionally to processors 312 from ROM 320. RAM 318 and ROM 320 may include any suitable computer-readable storage media.

Computer system 300 includes fixed storage 322 coupled bi-directionally to processors 312. Fixed storage 322 may be coupled to processors 312 via storage control unit 307. Fixed storage 322 may provide additional data storage capacity and may include any suitable computer-readable storage media. Fixed storage 322 may store an operating system (OS) 324, one or more executables (EXECs) 326, one or more applications or programs 328, data 330 and the like. Fixed storage 322 is typically a secondary storage medium (such as a hard disk) that is slower than primary storage. In appropriate cases, the information stored by fixed storage 322 may be incorporated as virtual memory into memory 316.

Processors 312 may be coupled to a variety of interfaces, such as, for example, graphics control 332, video interface 334, input interface 336, output interface 337, and storage interface 338, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 340 may couple processors 312 to another computer system or to network 342. With network interface 340, processors 312 may receive or send information from or to network 342 in the course of performing steps of particular embodiments. Particular embodiments may execute solely on processors 312. Particular embodiments may execute on processors 312 and on one or more remote processors operating together.

In a network environment, where computer system 300 is connected to network 342, computer system 300 may communicate with other devices connected to network 342. Computer system 300 may communicate with network 342 via network interface 340. For example, computer system 300 may receive information (such as a request or a response from another device) from network 342 in the form of one or more incoming packets at network interface 340 and memory 316 may store the incoming packets for subsequent processing. Computer system 300 may send information (such as a request or a response to another device) to network 342 in the form of one or more outgoing packets from network interface 340, which memory 316 may store prior to being sent. Processors 312 may access an incoming or outgoing packet in memory 316 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 316 may include one or more computer-readable storage media embodying software and computer system 300 may provide particular functionality described or illustrated herein as a result of processors 312 executing the software. Memory 316 may store and processors 312 may execute the software. Memory 316 may read the software from the computer-readable storage media in mass storage device 316 embodying the software or from one or more other sources via network interface 340. When executing the software, processors 312 may perform one or more steps of one or more processes described or illustrated herein, which may include defining one or more data structures for storage in memory 316 and modifying one or more of the data structures as directed by one or more portions the software, according to particular needs. In addition or as an alternative, computer system 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A computer-implemented method comprising:
    annotating, by one or more processors, each keyword of a plurality of keywords with one or more labels of a plurality of labels, wherein:
        each keyword comprises one or more words, describes one or more characteristics or features of a specific advertising subject matter, and has a corresponding keyword document,
        each label comprises one or more words, describes one or more aspects of or one or more categories or concepts represented by a specific keyword of the plurality of keywords, and has a corresponding label document, and
        annotating each keyword comprises:
            for each label, computing a score for the keyword document corresponding to the keyword and the label using an annotation model; and
            annotating the keyword with a specific label of the plurality of labels where the keyword document corresponding to the keyword and the specific label have the highest or the lowest score among a plurality of scores;
    constructing a classifier based on a plurality of training keywords, wherein:
        each training keyword comprises one or more words and has a corresponding training keyword document, and
        constructing the classifier comprises:
            for each training keyword of the plurality of training keywords,
                annotating the training keyword with one or more labels of the plurality of labels; and
                for each label annotating the training keyword,
                    determining a correctness of the label;
                    calculating a first index-wise product between a word count vector of the training keyword document corresponding to the training keyword and a word count vector of the label document corresponding to the label; and
                    forming a pair of the correctness and the first index-wise product; and
            training the classifier using one or more pairs of the correctness and the first index-wise product; and
    for each keyword of the plurality of keywords,
        for each label annotating the keyword,
            calculating a second index-wise product between a word count vector of the keyword document corresponding to the keyword and a word count vector of the label document corresponding to the label; and predicting whether the label annotating the keyword is correct using the classifier with the second index-wise product as an input to the classifier.

2. The method of claim 1, wherein the annotation model represents a mapping from a plurality of keyword documents respectively corresponding to the plurality of keywords to the plurality of labels.

3. The method of claim 2, further comprising constructing the annotation model based on the plurality of training keywords, comprising:
for each training keyword of the plurality of training keywords,
annotating the training keyword with one or more labels of the plurality of labels;
for each label annotating the training keyword, forming a pair of the label and the training keyword document corresponding to the training keyword; and
training the annotation model using one or more pairs of the label and the training keyword document.

4. The method of claim 1, further comprising:
for each keyword of the plurality of keywords, constructing the keyword document corresponding to the keyword; and
for each label of the plurality of labels, constructing the label document corresponding to the label.

5. The method of claim 1, further comprising:
for each keyword of the plurality of keywords,
for each label annotating the keyword,
calculating a confidence score based on the prediction made by the classifier for the keyword and the label;
accepting the label annotating the keyword when the confidence score of the keyword and the label is above a first threshold;
rejecting the label annotating the keyword when the confidence score of the keyword and the label is below a second threshold; and
manually reviewing the label annotating the keyword when the confidence score of the keyword and the label is between the first threshold and the second threshold.

6. The method of claim 1, further comprising:
defining a plurality of categories, each category being identified by one or more labels of the plurality of labels; and
for each category,
defining a plurality of subcategories, each subcategory being identified by one or more labels of the plurality of labels;
generating one or more keywords of the plurality of keywords; and
for each keyword generated for the category,
annotating the keyword with the one or more labels identifying the category; and
annotating the keyword with one of the one or more labels identifying each subcategory in the category.

7. The method of claim 1, further comprising:
grouping the plurality of keywords into one or more keyword groups based on similarities between the one or more labels annotating each keyword, each keyword group comprising one or more keywords of the plurality of keywords; and
forming one or more advertising groups from the one or more keyword groups, comprising:
forming at least one of the one or more advertising groups from each keyword group, each advertising group comprising at least one of the one or more keywords in the keyword group.

8. The method of claim 7, wherein forming at least one of the one or more advertising groups from each keyword group comprises:
determining similarities between the one or more keywords in the keyword group by applying a clustering algorithm to one or more keyword documents respectively corresponding to the one or more keywords in the keyword group; and
dividing the one or more keywords in the keyword group into the at least one of the one or more advertising groups based on the similarities between the one or more keywords in the keyword group.

9. The method of claim 7, further comprising:
accessing a plurality of advertisement templates for constructing advertisements to be presented to users, each advertisement template being associated with at least one of the one or more advertising groups;
for each advertising group, constructing one or more advertisements from the advertisement templates associated with the advertising group based on the labels annotating the keywords in the advertising group.

10. The method of claim 9, wherein:
each advertisement template of the plurality of advertisement templates comprises one or more dynamic elements, and
for each advertising group of the plurality of advertising groups, constructing one or more advertisements comprises:
selecting one or more of the advertisement templates applicable to the advertising group; and
for each of the selected advertisement templates,
substituting the dynamic elements in the selected advertisement template with one or more of the labels annotating the keywords in the advertising group to obtain one of the advertisements for the advertising group; and
associating a Uniform Resource Location (URL) of a landing page with the advertisement, the URL comprising the labels annotating the keywords in the advertising group.

11. A system comprising:
a memory comprising instructions executable by one or more processors; and
the one or more processors coupled to the memory and operable to execute the instructions, the one or more processors being operable when executing the instructions to:
annotate each keyword of a plurality of keywords with one or more labels of a plurality of labels, wherein:
each keyword comprises one or more words, describes one or more characteristics or features of a specific advertising subject matter, and has a corresponding keyword document,
each label comprises one or more words, describes one or more aspects of or one or more categories or concepts represented by a specific keyword of the plurality of keywords, and has a corresponding label document, and
annotate each keyword comprises:
for each label, compute a score for the keyword document corresponding to the keyword and the label using an annotation model; and
annotate the keyword with a specific label of the plurality of labels where the keyword document corresponding to the keyword and the specific label have the highest or the lowest score among a plurality of scores;
construct a classifier based on a plurality of training keywords, wherein:
each training keyword comprises one or more words and has a
corresponding training keyword document, and construct the classifier comprises:
for each training keyword of the plurality of training keywords, annotate the training keyword with one or more labels of
the plurality of labels; and
for each label annotating the training keyword,
determine a correctness of the label;
calculate a first index-wise product between a word count vector of the training keyword document corresponding to the training keyword and a word count vector of the label document corresponding to the label; and
form a pair of the correctness and the first index-wise product; and
train the classifier using one or more pairs of the correctness and the first index-wise product; and
for each keyword of the plurality of keywords,
for each label annotating the keyword,
calculate a second index-wise product between a word count vector of the keyword document corresponding to the keyword and a word count vector of the label document corresponding to the label; and
predict whether the label annotating the keyword is correct using the classifier with the second index-wise product as an input to the classifier.

12. The system of claim 11, wherein the annotation model represents a mapping from a plurality of keyword documents respectively corresponding to the plurality of keywords to the plurality of labels.

13. The system of claim 12, wherein the one or more processors are further operable when executing the instructions to
construct the annotation model based on the plurality of training keywords, comprising:
for each training keyword of the plurality of training keywords,
annotate the training keyword with one or more labels of the plurality of labels;
for each label annotating the training keyword, form a pair of the label and the training keyword document corresponding to the training keyword; and
train the annotation model using one or more pairs of the label and the training keyword document.

14. The system of claim 11, wherein the one or more processors are further operable when executing the instructions to:
for each keyword of the plurality of keywords, construct the keyword document corresponding to the keyword; and
for each label of the plurality of labels, construct the label document corresponding to the label.

15. The system of claim 11, wherein the one or more processors are further operable when executing the instructions to:
for each keyword of the plurality of keywords,
for each label annotating the keyword,
calculate a confidence score based on the prediction made by the classifier for the keyword and the label;
accept the label annotating the keyword when the confidence score of the keyword and the label is above a first threshold;
reject the label annotating the keyword when the confidence score of the keyword and the label is below a second threshold; and
manually review the label annotating the keyword when the confidence score of the keyword and the label is between the first threshold and the second threshold.

16. The system of claim 11, wherein the one or more processors are further operable when executing the instructions to:
define a plurality of categories, each category being identified by one or more labels of the plurality of labels; and
for each category,
define a plurality of subcategories, each subcategory being identified by one or more labels of the plurality of labels;
generate one or more keywords of the plurality of keywords; and
for each keyword generated for the category,
annotate the keyword with the one or more labels identifying the category; and
annotate the keyword with one of the one or more labels identifying each subcategory in the category.

17. The system of claim 11, wherein the one or more processors are further operable when executing the instructions to:
group the plurality of keywords into one or more keyword groups based on similarities between the one or more labels annotating each keyword, each keyword group comprising one or more keywords of the plurality of keywords; and
form one or more advertising groups from the one or more keyword groups, comprising:
form at least one of the one or more advertising groups from each keyword group, each advertising group comprising at least one of the one or more keywords in the keyword group.

18. The system of claim 17, wherein form at least one of the one or more advertising groups from each keyword group comprises:
determine similarities between the one or more keywords in the keyword group by applying a clustering algorithm to one or more keyword documents respectively corresponding to the one or more keywords in the keyword group; and
divide the one or more keywords in the keyword group into the at least one of the one or more advertising groups based on the similarities between the one or more keywords in the keyword group.

19. The system of claim 17, wherein the one or more processors are further operable when executing the instructions to:
access a plurality of advertisement templates for constructing advertisements to be presented to users, each advertisement template being associated with at least one of the one or more advertising groups;
for each advertising group, construct one or more advertisements from the advertisement templates associated with the advertising group based on the labels annotating the keywords in the advertising group.

20. The system of claim 19, wherein:
each advertisement template of the plurality of advertisement templates comprises one or more dynamic elements, and for each advertising group of the plurality of advertising groups, construct one or more advertisements comprises:
 select one or more of the advertisement templates applicable to the advertising group; and
 for each of the selected advertisement templates,
  substitute the dynamic elements in the selected advertisement template with one or more of the labels annotating the keywords in the advertising group to obtain one of the advertisements for the advertising group; and
  associate a Uniform Resource Location (URL) of a landing page with the advertisement, the URL comprising the labels annotating the keywords in the advertising group.

21. One or more computer-readable non-transitory storage media embodying software operable when executed by one or more computer systems to:
annotate each keyword of a plurality of keywords with one or more labels of a plurality of labels, wherein:
 each keyword comprises one or more words, describes one or more characteristics or features of a specific advertising subject matter, and has a corresponding keyword document,
 each label comprises one or more words, describes one or more aspects of or one or more categories or concepts represented by a specific keyword of the plurality of keywords, and has a corresponding label document, and
 annotate each keyword comprises:
  for each label, compute a score for the keyword document corresponding to the keyword and the label using an annotation model; and
  annotate the keyword with a specific label of the plurality of labels where the keyword document corresponding to the keyword and the specific label have the highest or the lowest score among a plurality of scores;
construct a classifier based on a plurality of training keywords, wherein:
 each training keyword comprises one or more words and has a corresponding training keyword document, and
 construct the classifier comprises:
  for each training keyword of the plurality of training keywords,
   annotate the training keyword with one or more labels of the plurality of labels; and
   for each label annotating the training keyword,
    determine a correctness of the label;
    calculate a first index-wise product between a word count vector of the training keyword document corresponding to the training keyword and a word count vector of the label document corresponding to the label; and
    form a pair of the correctness and the first index-wise product; and
  train the classifier using one or more pairs of the correctness and the first index-wise product; and
for each keyword of the plurality of keywords,
 for each label annotating the keyword,
  calculate a second index-wise product between a word count vector of the keyword document corresponding to the keyword and a word count vector of the label document corresponding to the label; and
  predict whether the label annotating the keyword is correct using the classifier with the second index-wise product as an input to the classifier.

22. The media of claim 21, wherein the annotation model represents a mapping from a plurality of keyword documents respectively corresponding to the plurality of keywords to the plurality of labels.

23. The media of claim 22, wherein the software is further operable when executed by the one or more computer systems to
construct the annotation model based on the plurality of training keywords, comprising:
 for each training keyword of the plurality of training keywords,
  annotate the training keyword with one or more labels of the plurality of labels;
  for each label annotating the training keyword, form a pair of the label and the training keyword document corresponding to the training keyword; and
  train the annotation model using one or more pairs of the label and the training keyword document.

24. The media of claim 21, wherein the software is further operable when executed by the one or more computer systems to:
for each keyword of the plurality of keywords, construct the keyword document corresponding to the keyword; and
for each label of the plurality of labels, construct the label document corresponding to the label.

25. The media of claim 21, wherein the software is further operable when executed by the one or more computer systems to:
for each keyword of the plurality of keywords,
 for each label annotating the keyword,
  calculate a confidence score based on the prediction made by the classifier for the keyword and the label;
  accept the label annotating the keyword when the confidence score of the keyword and the label is above a first threshold;
  reject the label annotating the keyword when the confidence score of the keyword and the label is below a second threshold; and
  manually review the label annotating the keyword when the confidence score of the keyword and the label is between the first threshold and the second threshold.

26. The media of claim 21, wherein the software is further operable when executed by the one or more computer systems to:
define a plurality of categories, each category being identified by one or more labels of the plurality of labels; and
for each category,
 define a plurality of subcategories, each subcategory being identified by one or more labels of the plurality of labels;
 generate one or more keywords of the plurality of keywords; and
 for each keyword generated for the category,
  annotate the keyword with the one or more labels identifying the category; and
  annotate the keyword with one of the one or more labels identifying each subcategory in the category.

27. The media of claim 21, wherein the software is further operable when executed by the one or more computer systems to:
group the plurality of keywords into one or more keyword groups based on similarities between the one or more labels annotating each keyword, each keyword group comprising one or more keywords of the plurality of keywords; and form one or more advertising groups from the one or more keyword groups, comprising:

form at least one of the one or more advertising groups from each keyword group, each advertising group comprising at least one of the one or more keywords in the keyword group.

28. The media of claim 27, wherein form at least one of the one or more advertising groups from each keyword group comprises:

determine similarities between the one or more keywords in the keyword group by applying a clustering algorithm to one or more keyword documents respectively corresponding to the one or more keywords in the keyword group; and divide the one or more keywords in the keyword group into the at least one of the one or more advertising groups based on the similarities between the one or more keywords in the keyword group.

29. The media of claim 27, wherein the software is further operable when executed by the one or more computer systems to:

access a plurality of advertisement templates for constructing advertisements to be presented to users, each advertisement template being associated with at least one of the one or more advertising groups;

for each advertising group, construct one or more advertisements from the advertisement templates associated with the advertising group based on the labels annotating the keywords in the advertising group.

30. The media of claim 29, wherein:

each advertisement template of the plurality of advertisement templates comprises one or more dynamic elements, and for each advertising group of the plurality of advertising groups, construct one or more advertisements comprises:

select one or more of the advertisement templates applicable to the advertising group; and for each of the selected advertisement templates, substitute the dynamic elements in the selected advertisement template with one or more of the labels annotating the keywords in the advertising group to obtain one of the advertisements for the advertising group; and associate a Uniform Resource Location (URL) of a landing page with the advertisement, the URL comprising the labels annotating the keywords in the advertising group.

* * * * *